US010449668B2

(12) United States Patent
Yang et al.

(10) Patent No.: US 10,449,668 B2
(45) Date of Patent: Oct. 22, 2019

(54) PLANAR MOTION DEVICE (71) Applicants: FUNDACIÓN TECNALIA RESEARCH & INNOVATION, San Sebastián-Guipúzcoa (ES); CENTRE NATIONAL DE LA RECHERCHE SCIENTIFIQUE (CNRS), Paris (FR)

(72) Inventors: Hai Yang, San Sebastián-Guipúzcoa (ES); Jean-Baptiste Izard, San Sebastián-Guipúzcoa (ES); Cédric Baradat, San Sebastián-Guipúzcoa (ES); Sébastien Krut, Paris (FR); François Pierrot, Paris (FR); Marc Gouttefarde-Tanich, Paris (FR); Olivier Company, Paris (FR)

(73) Assignees: FUNDACIÓN TECNALIA RESEARCH & INNOVATION, San Sebastián-Guipúzcoa (ES); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 192 days.

(21) Appl. No.: 15/537,762

(22) PCT Filed: Dec. 19, 2014

(86) PCT No.: PCT/EP2014/078932
§ 371 (c)(1),
(2) Date: Jun. 19, 2017

(87) PCT Pub. No.: WO2016/096057
PCT Pub. Date: Jun. 23, 2016

(65) Prior Publication Data
US 2018/0009103 A1 Jan. 11, 2018

(51) Int. Cl.
*B25J 9/10* (2006.01)
*B25J 9/00* (2006.01)

(52) U.S. Cl.
CPC .................... *B25J 9/0078* (2013.01)

(58) Field of Classification Search
CPC ......................................... B25J 9/0078
(Continued)

(56) References Cited

U.S. PATENT DOCUMENTS 2,746,151 A * 5/1956 Kennedy ............... B23Q 1/621
33/1 M
3,492,421 A * 1/1970 Cameron ............... G08C 21/00
178/19.03
(Continued)

FOREIGN PATENT DOCUMENTS

CH 703454 A2 1/2012
DE 102010015530 B4 10/2010
(Continued)

OTHER PUBLICATIONS

International Search Report and Written Opinion dated Sep. 9, 2015 re: Application No. PCT/EP2014/078932; pp. 1-9.

*Primary Examiner* — Christopher W Fulton
(74) *Attorney, Agent, or Firm* — Cantor Colburn LLP (57) ABSTRACT A positioning device includes a planar surface, a mobile platform configured to slide along the planar surface and cables for positioning and moving the mobile platform along the planar surface. The mobile platform includes a planar bearing system located at the side of the mobile platform configured to slide along the planar surface. The planar bearing system includes a component for pushing the mobile platform against the planar surface; and a component for allowing sliding of the planar bearing system with respect to the planar surface.

18 Claims, 7 Drawing Sheets (58) Field of Classification Search
USPC .......................................................... 33/1 M
See application file for complete search history.

(56) References Cited

U.S. PATENT DOCUMENTS

| | | | | |
|---|---|---|---|---|
| 4,315,437 A * | 2/1982 | Etcheparre | ............. | B23Q 1/621 |
| | | | | 33/1 M |
| 4,412,383 A * | 11/1983 | Landa | ................... | G01D 15/24 |
| | | | | 33/1 M |
| 4,856,197 A * | 8/1989 | Auer | ......................... | B43L 1/00 |
| | | | | 33/18.1 |
| 4,918,817 A * | 4/1990 | Eaton | ..................... | G01B 5/004 |
| | | | | 33/1 M |
| 5,134,779 A * | 8/1992 | Sprenger | ................. | G01D 9/40 |
| | | | | 33/1 M |
| 5,148,716 A | 9/1992 | Suda | | |
| 6,176,018 B1 * | 1/2001 | Wiklund | ............. | G01B 5/0002 |
| | | | | 33/1 M |
| 6,457,792 B1 * | 10/2002 | Saund | ................... | B43L 13/024 |
| | | | | 33/1 M |
| 7,246,445 B2 | 7/2007 | Thallner | | |
| 8,919,003 B1 * | 12/2014 | Shoham | ................. | B43L 3/008 |
| | | | | 33/1 M |
| 2008/0052928 A1 * | 3/2008 | Parel | ................... | G01C 15/004 |
| | | | | 33/291 |
| 2013/0219732 A1 * | 8/2013 | Jordan | ................ | E04G 21/1891 |
| | | | | 33/613 |

FOREIGN PATENT DOCUMENTS

| | | | |
|---|---|---|---|
| EP | 2578367 A1 | 4/2013 | |
| WO | 2011148004 A1 | 12/2011 | |
| WO | WO-2015119323 A1 * | 8/2015 | ............ B25J 9/0078 |

* cited by examiner

PLANAR MOTION DEVICE

TECHNICAL FIELD

The present disclosure relates to the field of planar motion mechanisms and, in particular, to planar motion mechanisms and robotic devices based on planar motion mechanisms which permit the positioning of actuators, manipulators, tools or any other element, for activities of production, manipulation, modification or inspection.

BACKGROUND

Conventional robots, either based on parallel kinematics or on serial kinematics, are formed by a series of mechanical actuators and structures with fixed dimensions, which limit the range of their work space to the maximum that can be reached by their articulations and structures. Larger work spaces require larger, heavier and more dynamic structures which involve oversizing the actuators, which finally complicates the automation of large-sized parts.

To alleviate these drawbacks, parts of the structure of robots have been replaced with cables in combination with a support surface. Cables are light-weighted and can be extended in large workspace. Tensioned cables can be used to apply pulling forces. That is why in most cable-based parallel planar robots, cables are responsible for the function of actuation. To achieve the planar constraints, different solutions exist.

German patent DE102010015530-B4 describes a cable-based planar motion mechanism having a vertical arrangement, in which the virtual plane can only be parallel to the gravity force. The mobile platform, which is actuated by several cables in the vertical plane, moves in the virtual vertical plane against gravity force. As a consequence, the mechanism has very poor resistance to perturbations coming from outside of the virtual plane.

U.S. Pat. No. 7,246,445-B2 refers to a cable-based planar mechanism in which a flat table is used. The mobile platform is located on this table and several cables are used to actuate the movement of the mobile platform in the plane that is parallel to the table. This arrangement offers a better unilateral perturbation than that of DE102010015530-B4, because the mobile platform can push against the table. Although U.S. Pat. No. 7,246,445-B2 indicates that the table may be aligned horizontally and may also run diagonally to the horizontal, up to a vertical position, in fact no means for keeping the mobile platform against the table during the moment has been mentioned.

It can therefore be understood from its description that it is only the portions of gravity force which keep the mobile platform against the table during the movement of the mobile platform. Thus, when pulling forces, for example, with magnitude of gravity, are exerted on the mobile platform, it is difficult to insure the planar movement of the mobile platform. It is worthy to notice that in U.S. Pat. No. 7,246,445-B2, one of the proposed embodiment of the table is described as with multiple capillary holes below the seat which are connectable to a partial vacuum source, in order to be able to suction the seat in place against the table after reaching the desired final position'. The mentioned capillary holes, when connected to a vacuum source, has the only function of fixing the position of the seat after reaching the desired final position, thus having no function of exerted forces on the seat during the movement for preventing it from being separated from the table to ensure a high dynamic planar motion of the seat alone the table.

International patent application WO2011148004-A1 partially solves the above-mentioned problems by providing a cable-based planar motion mechanism in which obliquely extended cables guarantee the movement of the mobile platform against a supporting table. As a consequence, the mechanism can work in any orientation, as the table together with the obliquely extended cables offer bilateral constraints to keep the movement of the mobile platform in a plane. The platform can work on inclined surfaces and even upside down surfaces thanks to an attraction system between the platform and the working surface. This attraction system is generated by a perpendicular component of the cables forces: since the cables have an oblique orientation with respect to the work surface, a force component is generated on the platform which constantly maintains it against the work surface. However, this implementation requires high tensions in the cables. Consequently, the power consumption of actuators is increased, requiring that much more powerful actuators be used in comparison the ones needed to solely generate the target movement.

SUMMARY

The disclosure provides a cable-based plane motion mechanism which can resist strong perturbation forces which are perpendicular to such plane and/or strong perturbation torques which are parallel to such plane, so that such plane mechanism can work properly in any orientation, dynamically and with high accuracy and high payload, in comparison to other existing cable-based plane motion mechanisms.

According to an aspect of the present disclosure, there is provided a positioning device comprising a planar surface, a mobile platform configured to slide along said planar surface and cables for positioning and moving said mobile platform along said planar surface. The mobile platform comprises a planar bearing system located at the side of the mobile platform configured to slide along the planar surface, said planar bearing system comprising: means for pushing the mobile platform against the planar surface; and means for allowing sliding of said planar bearing system with respect to the planar surface.

In a particular embodiment, the means for pushing the mobile platform against the planar surface comprises a vacuum chamber. In a preferred embodiment, the means for pushing the mobile platform against the planar surface further comprises sealing means.

In a particular embodiment, the means for allowing sliding of said planar bearing system with respect to the planar surface, comprises at least one caster ball.

In an alternative embodiment, the means for pushing the mobile platform against the planar surface comprises a magnetic system.

In a particular embodiment, the planar bearing system comprises at least one air bearing.

In an alternative embodiment, the planar bearing system comprises at least one vacuum preloaded air bearing.

In a particular embodiment, the device further comprises a gripping device attached to said mobile platform.

In a particular embodiment, the mobile platform is located under said planar surface.

In another aspect of the disclosure, it is provided the use of the device previously described, as a pick & place robot.

Additional advantages and features of the disclosure will become apparent from the detailed description that follows and will be particularly pointed out in the appended claims.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures.

DETAILED DESCRIPTION OF THE DRAWINGS

In this text, the term "comprises" and its derivations (such as "comprising", etc.) should not be understood in an excluding sense, that is, these terms should not be interpreted as excluding the possibility that what is described and defined may include further elements, steps, etc.

In the context of the present disclosure, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The following description is not to be taken in a limiting sense but is given solely for the purpose of describing the broad principles of the disclosure. Next embodiments of the disclosure will be described by way of example, with reference to the above-mentioned drawings showing apparatuses and results according to the disclosure.

Figure 1A:
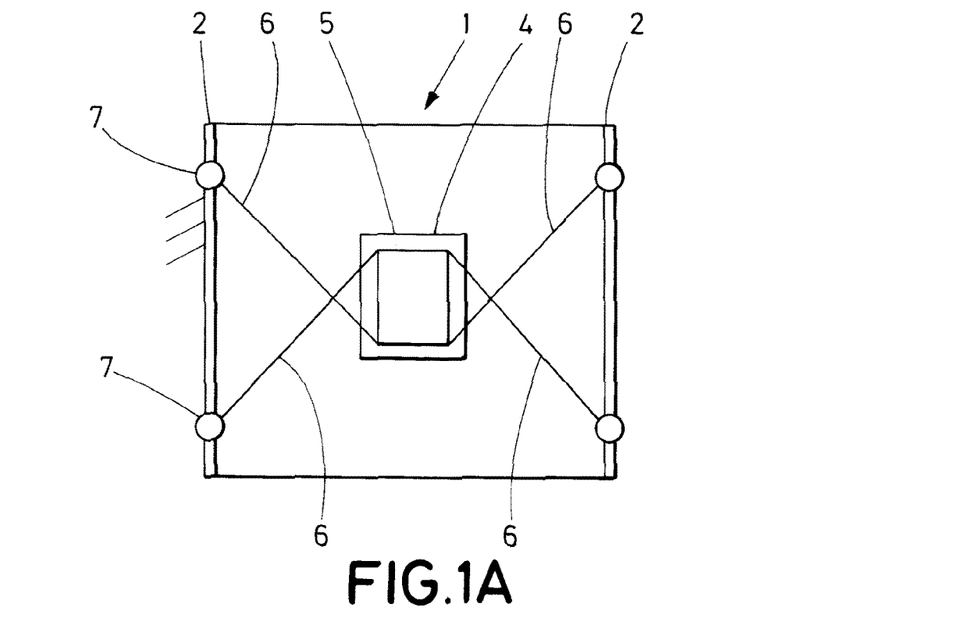
FIGS. 1A, 1B and 1C show a schematic representation of the positioning device according to an embodiment of the disclosure.
Figure 1B:
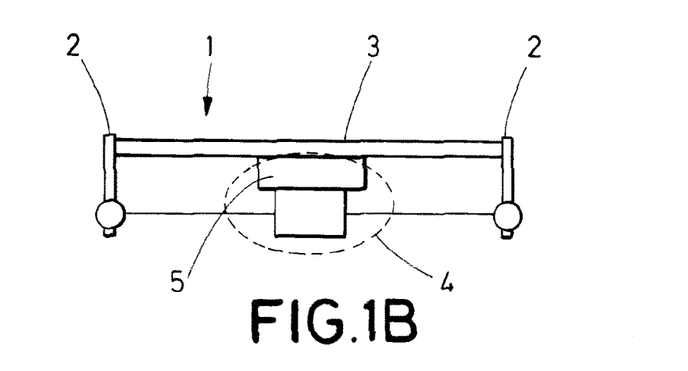
Figure 1C:
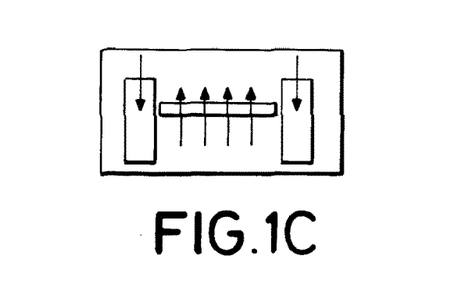
Figure 1D:
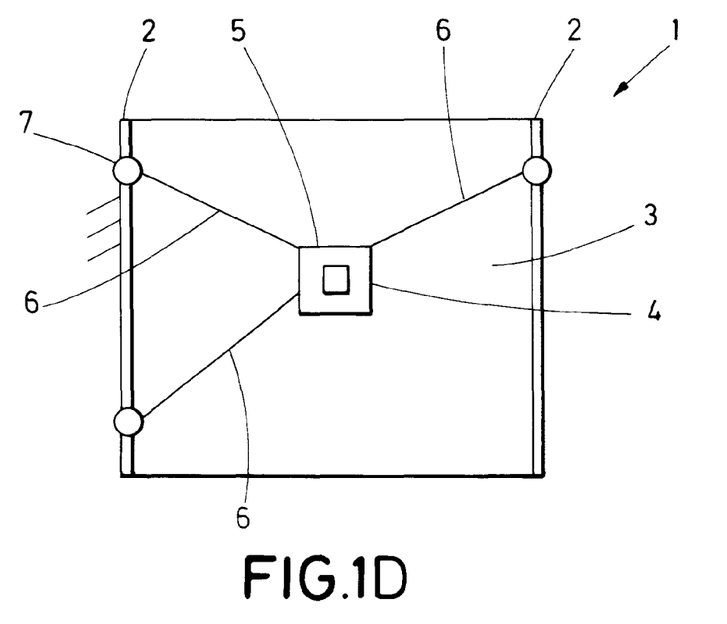
FIG. 1D shows a schematic representation of the positioning device according to another embodiment of the disclosure.
Figure 1E:
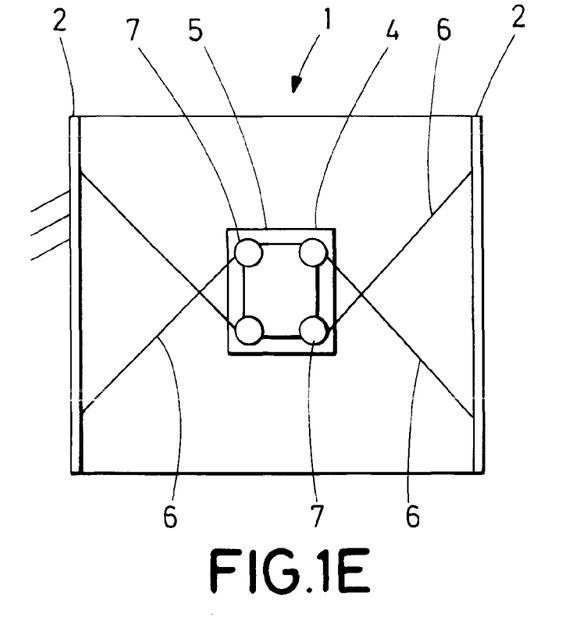
FIG. 1E shows a schematic representation of the positioning device according to another embodiment of the disclosure.

FIGS. 1A, 1B and 1C show a schematic representation of the positioning device 1. FIGS. 1D and 1E show alternative embodiments of the positioning device 1. The positioning device 1 comprises a frame 2 supporting a planar element or planar surface 3 and a mobile platform 4 which can slide on the surface defined by the planar element 3. The mobile platform 4 is preferably located or suspended under the planar surface 3. Alternatively, the mobile platform 4 can be located or suspended above the planar surface 3. This implementation is suitable for pick & place robots, in which a grasping element is attached to the mobile platform 4. The planar element 3 (and therefore the mobile platform 4 connected thereto) can have any orientation. The planar surface 3 is not necessarily parallel to the floor, but can be inclined or vertical (perpendicular) with respect to the floor, which is considered as reference system. The mobile platform 4 then slides on the face of the planar surface on which it is located (which is preferably the lower face but can alternatively be the upper one, depending on the application for which it is configured), either in parallel to the floor or in oblique orientation with respect to the floor or perpendicular (vertical plane) to the floor. In other words, the mobile platform 4 can work upside down. This means that the mobile platform 4 is able to work either on a horizontal planar surface (as illustrated for example in FIG. 1B, which shows a mobile platform working upside down), on a vertical planar surface, or an inclined planar surface. FIGS. 1A, 1D and 1E also show some cables 6. The function of the cables 6 is to control the allowed movements of the mobile platform 4. Thanks to the planar element 3 and the planar bearing system 5 (which is explained in detail later), the allowed movements of the mobile platform 4 are the movements along the planar element 3, which comprises translations along axes that are parallel to the planar element 3 and rotations along axes that are perpendicular to the planar element 3. By adjusting the lengths and/or tensions of at least one of the cables 6, such allowed movements along the planar element 3 are controlled. In order to obtain the desired movement of the mobile platform 3, the cables 6 contribute to overcome various perturbations on the mobile platform which can be caused by various reasons according to the set-up and applications of the positioning device. For example, such perturbations can be gravity, other external forces exerted on the mobile platform, reaction forces exerted by accelerating components on the mobile platform, etc.

The positioning device 1 comprises at least three tension elements or cables 6, as depicted in FIG. 1D, each of which are linked at one end to the mobile platform 4 and at the other end to actuating means (schematically referred to as 7). The function of the cables is to control movement of the platform. If there are 3 cables, like in the implementation of FIG. 1D, the position (x, y) of the mobile platform is controlled independently (but not its orientation, since the equilibrium orientation of the mobile platform depends on its position). If there are 4 cables, like in the implementation of FIG. 1A, not only the position of the platform, but also its orientation, are controlled independently. In other words, four cables control three independent degrees of freedom: position (x, y) and rotation (z), wherein the controlled rotation is along axes that are perpendicular to the planar element 3. In a preferred implementation, illustrated in FIG. 1A, there are four cables or tension elements 6. The tension elements 6 exert forces on the mobile platform 4, allowing its positioning and moving on the planar surface 3. These four tension elements or cables 6 permit obtaining the position and controlled rotation (or absence of rotation) of the mobile platform 4. The end of each cable 6 which is linked to the actuating means 7, is attached to a cable gathering and release mechanism which controls the length and tension of the corresponding cable and which preferably remains fixed on the frame. The other end of each cable 6 is anchored to the mobile platform 4. The operation of the cable gathering and release mechanism allows displacing the mobile platform 4 along the entire planar surface 3 in a controlled manner and precisely positioning it. The attaching points of the cables 6 on the mobile platform 4 can either stay in a planar surface or in any other way.

In FIG. 1E, the actuating means 7, which is attached to a cable gathering and release mechanism which controls the length and tension of the corresponding cable, can be fixed on the mobile platform 4. The other end of each cable 6 is anchored to the frame 2.

The mobile platform 4 comprises a planar bearing system 5 located at the side of the mobile platform 4 configured to slide along the planar surface 3. The planar bearing system 5 maintains the mobile platform 4, regardless of the orientation of the planar surface 3, supported against the planar surface 3 and in equilibrium with any external or internal excitation. The planar bearing system is responsible for the attachment of the mobile platform 4 to the planar surface 3. The planar bearing system 5 and the planar surface 3 restrict three degrees of freedom of the mobile platform 4: two rotations and one displacement. The cables 6 allow controlling the rotation on the shaft (z) perpendicular to the planar surface 3, as well as two displacements on the plane of the surface (x, y). As described next, the planar bearing system 5 comprises means for pushing the mobile platform 4 against the planar surface 3, thus preventing the mobile platform 4 from separating from the planar surface 3 or from rotating in an axis parallel to the planar surface 3; and means for allowing sliding of the planar bearing system 5 with respect to the planar surface 3.

This system 5 allows the movements of the mobile platform 4 along the plane defined by the planar surface 3. It is remarked that the planar bearing system 5 allows said movements, but does not provide or block the movements because it is the cabling system which controls the movement. FIG. 1C illustrates the principle of action of the planar bearing system, in which the upwards arrows indicate attraction force which pushes the planar bearing system towards the planar surface, while the downwards arrows indicate the repulsion force that stops the planar bearing system approaching or penetrating into the planar bearing surface. In most cases, these two forces exist simultaneously on the planar bearing system. The resultant force of these two forces contribute to overcome various perturbation forces on the mobile platform caused by various factors (such as external forces on mobile platform, forces or torques generated by cables, installation directions of the system regarding to gravity etc.)

From a kinematics point of view, the planar bearing system 5 has the function of constraining three degrees of freedom (one translation along axes that are perpendicular to the planar element 3 and two rotations along axes that are parallel to the planar element 3) of the mobile platform 4. The planar bearing system 5 keeps the mobile platform 4 pushed towards the planar surface 3. It also permits sliding the mobile platform on the planar surface. It provides the mobile platform 4 with resistance to perturbation forces and torques that may cause parasite movement of the mobile platform 4 outside of the plane (planar surface 3). In other words, the planar bearing system 5 can provide an attraction force (or attaching force) or attraction forces between the mobile platform and the planar surface. Unlike in prior art positioning devices, such as the device described in U.S. Pat. No. 7,246,445-B2, which only relies on gravity for such pushing effect, or the one described in WO2011148004-A1, which required a relatively complex cabling system because the attraction between the mobile platform and the working surface relied totally on a perpendicular component of the cables forces, in the positioning device 1 of the present disclosure, the attraction between the mobile platform and the working surface is based on the planar bearing system 5.

Next, different embodiments of the planar bearing system are described. The planar bearing system 5 comprises means for being attached to (pushing towards) the planar surface 3 by exerting an attaching force (also called attraction force), and means for being slided on the planar surface 3 by exerting a supporting force or pushing force.

Figure 2A:
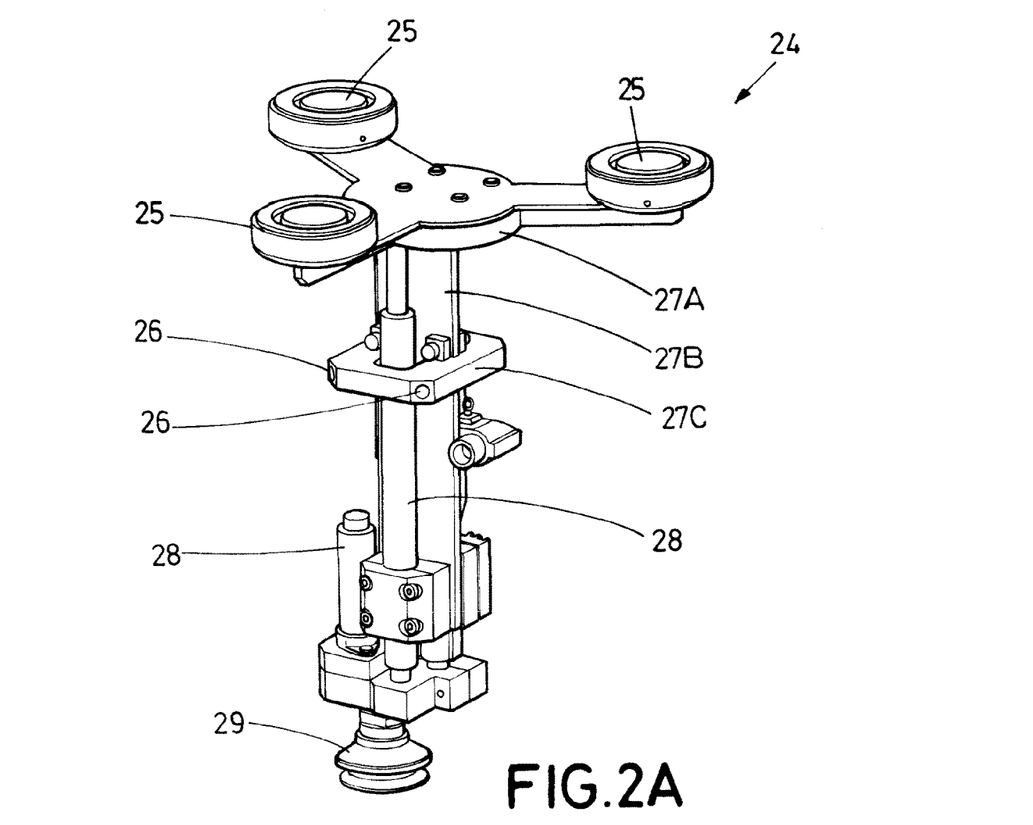
FIG. 2A shows a scheme of a planar bearing system according to a particular embodiment of the disclosure, implemented by vacuum preloaded air bearings.

FIG. 2A shows a possible embodiment of a mobile platform 24 comprising a planar bearing system 25. In this embodiment, the planar bearing system is formed by at least one air bearing 25. The number of necessary air bearings depends on several factors, such as, the wrench (perpendicular force and parallel torques) the bearing is supposed to resist to, their dimensions, the dimensions and weight of the tool they are configured to carry, among others. The planar bearing system 25 of FIG. 2A is formed by three air bearings. The air bearings 25 permit the contactless sliding of the mobile platform 24 along two axis x y (that is to say, on a plane parallel to the supporting surface 3, not illustrated in FIG. 2A) and rotation around the z axis perpendicular to the planar surface. Supporting elements 27A 27B 27C are used as a structure for the planar bearing system 25 and for the remaining elements of the mobile platform 24. The attachments 26 for the cables are also illustrated in the mobile platform 24. In the shown view, only two attachments 26 are shown, of a total of four attachments. The action of the cables also permits limited rotation and translations.

A gripping device 29 has been connected to the lower end of the mobile platform 24. The selection of the gripping element or any other element to be used depends on the particular application for which the device is used. Actuating means 28 for actuating the gripping device 29 are also shown in FIG. 2A. In this embodiment, the actuating means are independent motors 28 which provide independent movements of rotation and translation. In FIG. 2A, "z axis" refers to the translation axis of the gripping device 29, and 'theta axis' refers to the rotation axis of the gripping device.

Figure 2B:
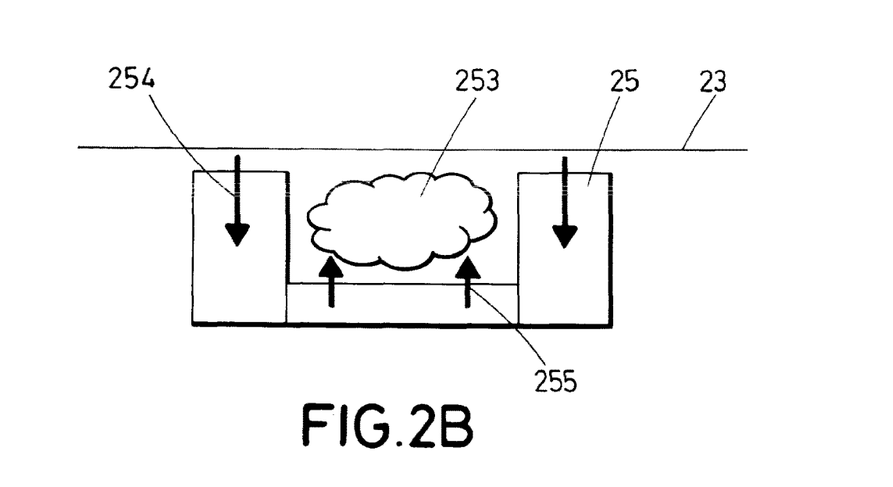
FIG. 2B shows a schematic representation of a vacuum preloaded air bearing.

FIG. 2B shows a schematic representation of a vacuum preloaded air bearing 25, in which its working principle is illustrated. The vacuum preloaded air bearing 25 receives two opposite forces 254 255 (also illustrated as solid arrows in FIG. 1C). The upwards arrows 255 indicate attraction force which keeps the air bearing against the planar surface while the downwards arrows 254 indicate pushing force that stops the air bearing approaching further towards the planar surface. The illustrated vacuum preloaded air-bearing uses high pressure air for generating repulsion force 254 and vacuum chamber for generating attraction force 255. A vacuum 253 is created between the vacuum preloaded air bearing 25 and the surface 23 on which the mobile platform is to slide. As shown in FIG. 2B, the vacuum preloaded air bearing 25 is contactless with respect to this surface 23. There is no friction between them. The vacuum 253 works as means for pushing the preloaded air-bearing towards the surface, but thanks to the repulsion force 254, no physical contact between the air bearing and the surface is established.

Figure 3:
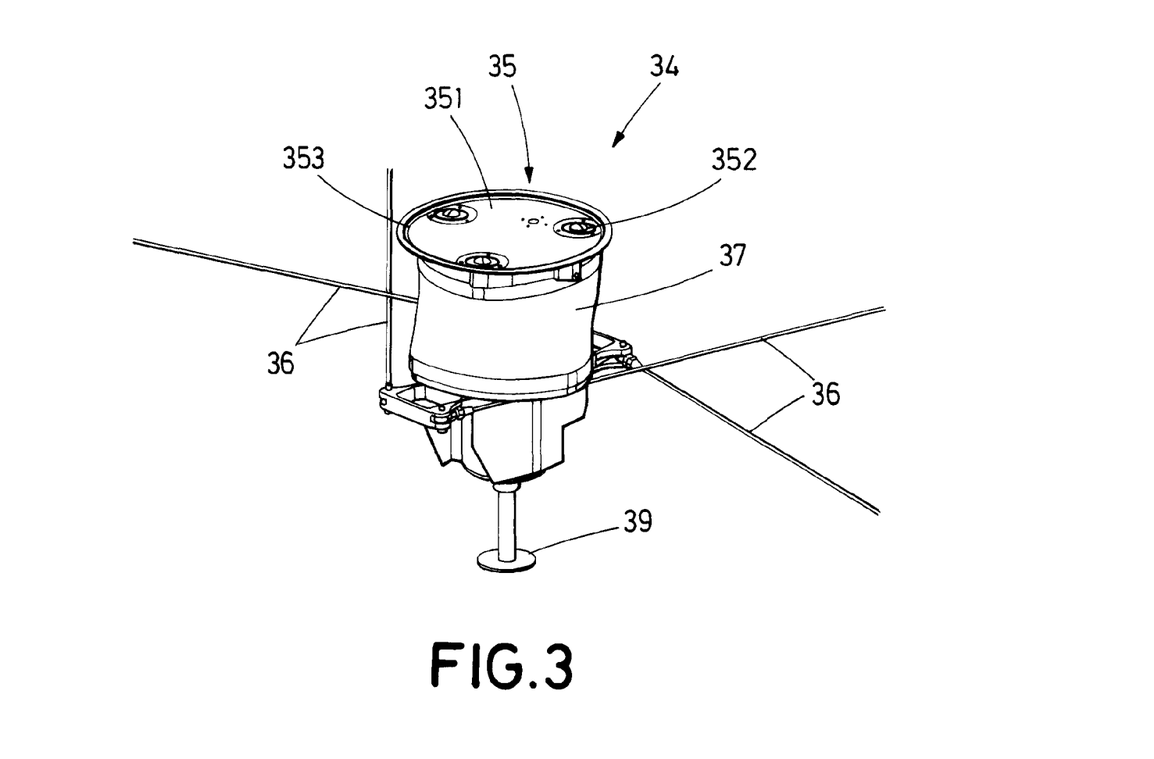
FIG. 3 shows a scheme of a planar bearing system according to a particular embodiment of the disclosure, implemented by a vacuum system and caster balls.

FIG. 3 shows an alternative embodiment of the planar bearing system 35 (and mobile platform 34 in which it is comprised). The planar bearing system 35 is formed by at least one vacuum chamber 351 and means for sliding 352 of the mobile platform 34 along a plane parallel to the supporting surface (not illustrated). The planar bearing system 35 is circular in this figure, but other shapes are also possible, such as oval or pseudo-circular. A seal 353 (annular seal in FIG. 3) flexibly connects—with contact—the planar bearing system 35 to the surface along which it slides. In a possible embodiment, the seal 353 is made of a combination or rubber and Teflon (or any preloaded low-friction air-tight compound). In the particular embodiment of FIG. 3, the means for sliding 352 are a plurality of caster balls. Preferably three caster balls 352 are used. In alternative embodiments, the means for sliding 352 are at least one magnetic element or at least one friction disc surfaces or pressure means by air. The caster balls 352 (or alternative sliding means) permit the sliding with physical contact of the mobile platform 34 along a plane parallel to the supporting surface. The balls permit the sliding between the platform and the surface. The balls are in contact with the planar surface and roll on it. A vacuum system provides vacuum forces to the vacuum chamber 351, which acts as a means for attaching the mobile platform 34 to the planar surface. In FIG. 3 the balls are housed within the vacuum chamber 351, but they could be outside instead.

FIG. 3 also shows a gripping tool 39 attached to the mobile platform 34. The gripping tool 39 has been included with exemplary purpose and is not limited to the kind of planar bearing system of FIG. 3. The structure and supporting elements are within a box or sleeve 37. This configuration is particularly useful in the foodstuff industry, in which the hygienic requirements are very strict. Within the sleeve 37 there are also additional needed elements, such as electro-valves, electric sensors and so on. Four cables 36 are illustrated, as well as their corresponding attachments. The action of the cables permits limited rotation. The sleeve 37 also hides the actuating means which are necessary for actuating the gripping tool 39.

The means for sliding is either a mechanical sliding friction bearing, such as a frictional disc, or a caster ball bearing, or an omni wheel, or a pressure air means or a magnetic means, or any other mechanism which enables sliding along a surface.

Figure 4:
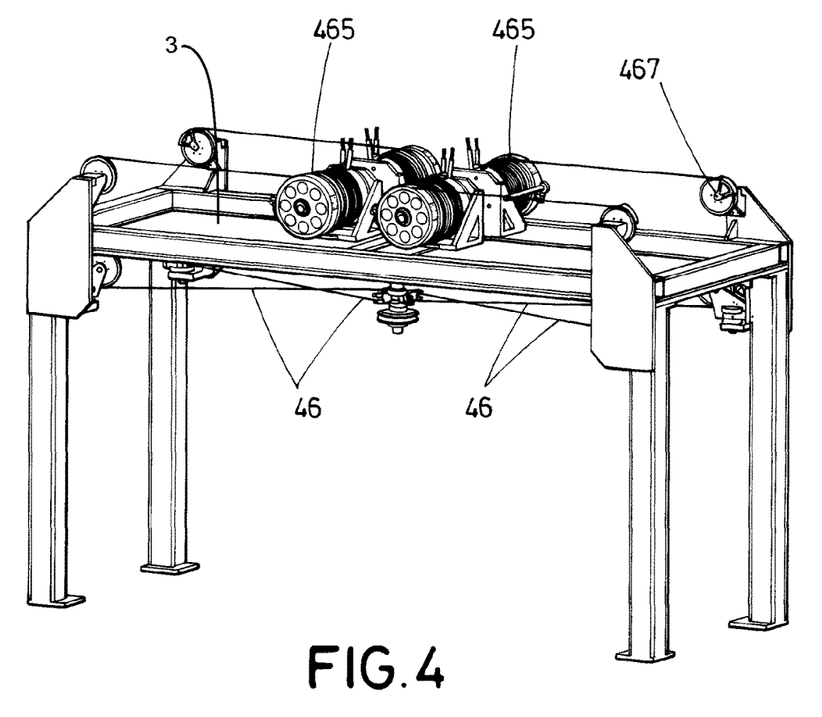
FIG. 4 shows a positioning device controlled by cables according to an embodiment of the present disclosure.
Figure 5:
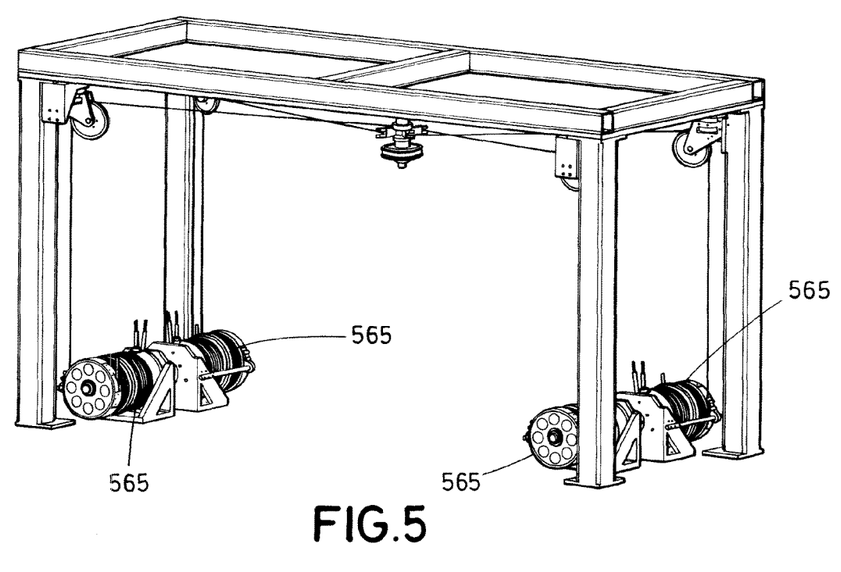
FIG. 5 shows a positioning device controlled by cables according to an alternative embodiment of the present disclosure.
Figure 6:
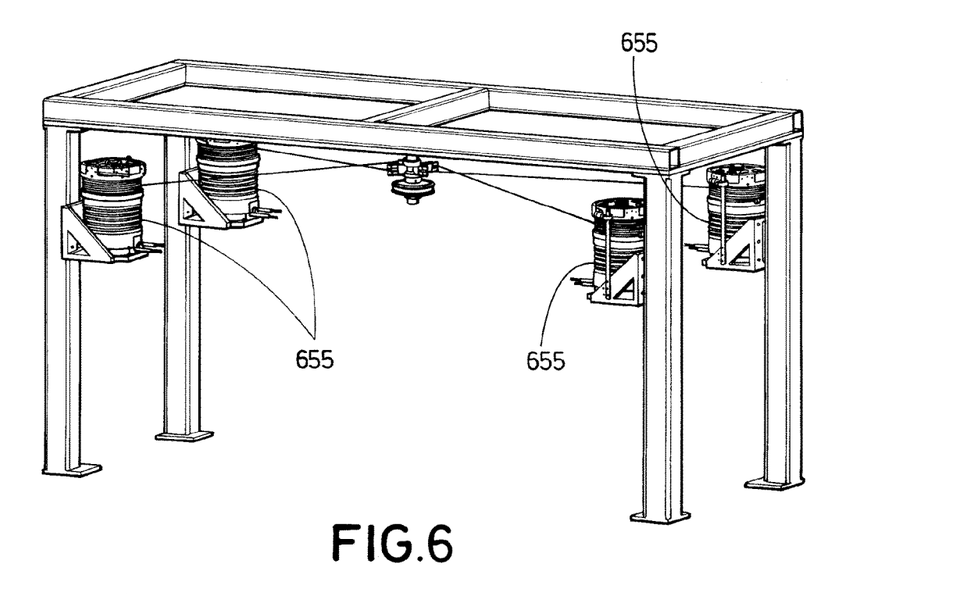
FIG. 6 shows a positioning device controlled by cables according to an alternative embodiment of the present disclosure.

FIGS. 4, 5 and 6 show different embodiments of positioning devices controlled by cables according to the present disclosure. As can be observed, the location of the elements for controlling and actuating the cables can vary without altering the correct functioning of the positioning device. In FIG. 4, the four actuators 465 (one per cable 46) are located above the planar surface 3. The mobile platform moves along the lower face of the planar surface 3. A pulley system formed by four pulleys 467 can be used as guiding means to ease movement. This configuration for the actuating means is recommended in applications in which strict hygienic constraints are imposed. In FIG. 5, the four actuators 565 (one per cable) are located on the floor, close to the structure which supports the positioning device. FIG. 6 shows an embodiment where the actuators 655 are installed at the same height of the mobile platform, so that no pulleys 467 such as in FIG. 4 and FIG. 5 are needed for guiding the cable routing. A tool, for example a grasping element, is connected to the positioning device 1. Any other end-effector can be installed, depending on the needs of the application for which the robot is configured to work.

In sum, a system which controls the movement of a mobile platform sliding on a planar surface has been described. The translational motion and rotation motion of the mobile platform on the planar surface is activated by means of cables. The mobile platform is kept against the planar surface on which it is able to slide by means of an planar bearing system which generates forces—either for joining or for separating, depending on the needs—, based on various factors such as the direction of installation (horizontal, vertical, reversed or inclined) of the sliding surface, the reaction forces/torques generated by accelerating the mobile platform itself or the components on the mobile platform (for example, the reaction force on mobile platform caused by the embedded z-axis translation), the external forces exerted on the mobile platform or the tool installed on the mobile platform etc.

The system comprises a supporting surface and a mobile platform comprising a planar bearing system. Any element, such as a load, a robot arm or a gripping element, can be attached to the mobile platforms to perform complex tasks. The system can additionally include at least one control unit and other elements, such as encoders and motors, which are out of the scope of the present disclosure.

The frame can be fixed on the ground, on a wall, on another frame acting as a main frame or on a mobile base.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A positioning device comprising a planar surface, a mobile platform configured to slide along said planar surface and cables for positioning and moving said mobile platform along said planar surface, wherein said mobile platform comprises a planar bearing system located at the side of the mobile platform configured to slide along the planar surface, said planar bearing system including: means for pushing the mobile platform against the planar surface; and means for allowing sliding of said planar bearing system with respect to the planar surface, the planar bearing system keeping the mobile platform pushed towards the planar surface while permitting sliding of the mobile platform on the planar surface.

2. The device of claim 1, wherein said means for pushing the mobile platform against the planar surface comprises a vacuum chamber.

3. The device of claim 2, wherein said means for pushing the mobile platform against the planar surface further comprises sealing means.

4. The device of claim 1, wherein said means for allowing sliding of said planar bearing system with respect to the planar surface comprises at least one caster ball.

5. The device of claim 1, wherein said means for pushing the mobile platform against the planar surface comprises a magnetic system.

6. The device of claim 1, wherein said planar bearing system comprises at least one air bearing.

7. The device of claim 1, wherein said planar bearing system comprises at least one vacuum preloaded air bearing.

8. The device of claim 1, further comprising a gripping device attached to said mobile platform.

9. The device of claim 1, wherein said mobile platform is located under said planar surface.

10. Use of the device of claim 1 as a pick and place robot.

11. A pick and place robot comprising a positioning device comprising:
a planar surface,
a mobile platform configured to slide along said planar surface, a plurality of cables for positioning and moving said mobile platform along said planar surface, and
a gripping device attached to said mobile platform,
wherein the mobile platform comprises a planar bearing system located at the side of the mobile platform configured to slide along the planar surface, said planar bearing system comprising: means for pushing the mobile platform against the planar surface; and means for allowing sliding of said planar bearing system with respect to the planar surface, the planar bearing system keeping the mobile platform pushed towards the planar surface while permitting sliding of the mobile platform on the planar surface.

12. The pick and place robot of claim 11, wherein said means for pushing the mobile platform against the planar surface comprises a vacuum chamber.

13. The pick and place robot of claim 12, wherein said means for pushing the mobile platform against the planar surface further comprises sealing means.

14. The pick and place robot of claim 11, wherein said means for allowing sliding of said planar bearing system with respect to the planar surface comprises at least one caster ball.

15. The pick and place robot of claim 11, wherein said means for pushing the mobile platform against the planar surface comprises a magnetic system.

16. The pick and place robot of claim 11, wherein said planar bearing system comprises at least one air bearing.

17. The pick and place robot of claim 11, wherein said planar bearing system comprises at least one vacuum pre-loaded air bearing.

18. The pick and place robot of claim 11, wherein said mobile platform is located under said planar surface.

* * * * *